W. NEWLIN.
Process of Making Wheels.
No. 224,215. Patented Feb. 3, 1880.
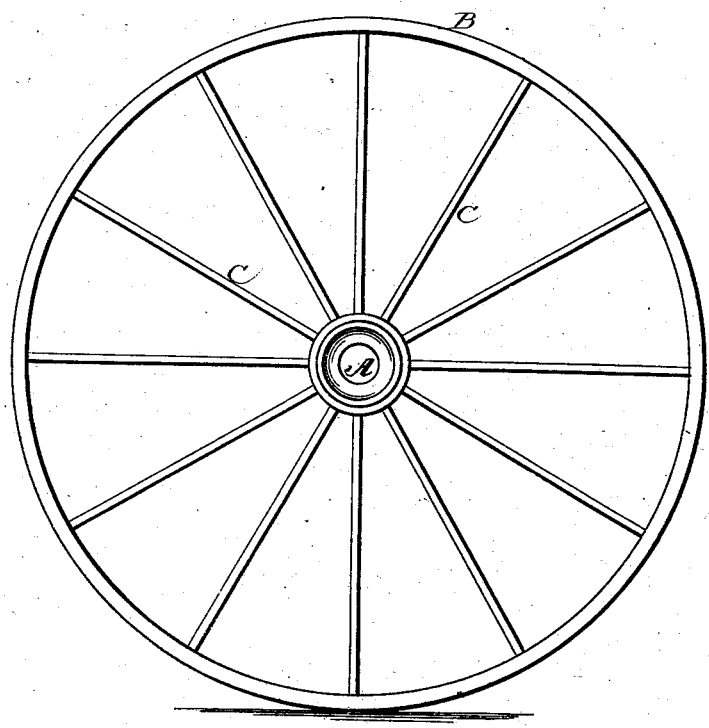
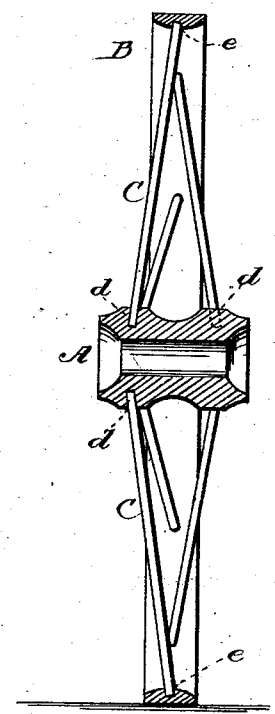
WITNESSES
Robert Everett
Chas. G. Page
INVENTOR
William Newlin
Gilmore Smith & Co.
ATTORNEYS

UNITED STATES PATENT OFFICE.

WILLIAM NEWLIN, OF ATTICA, INDIANA.

PROCESS OF MAKING WHEELS.

SPECIFICATION forming part of Letters Patent No. 224,215, dated February 3, 1880.

Application filed November 22, 1879.

*To all whom it may concern:*

Be it known that I, WILLIAM NEWLIN, of Attica, in the county of Fountain and State of Indiana, have invented certain new and useful Improvements in Processes for Constructing Vehicle-Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my wheel, and Fig. 2 is a vertical sectional view of the same.

The object of my present invention is to produce a light substantial wheel for agricultural implements and other purposes by the expansion and contraction of metals, so as to unite the several parts without the use of screws, nuts, or bolts; and to this end I employ a process consisting in securing the spokes in an upper series of holes in the hub, then dropping the heated and expanded tire around the outer ends of the spokes and in line with the center of the hub, next subjecting the hub to pressure to cause it to pass the center of the tire, and finally fitting a second series of spokes in the hub and the expanded tire and removing pressure from the hub, all as hereinafter more fully described, and particularly pointed out in the claim.

In the accompanying drawings, A designates the hub, B the tire, and C the spokes, of a wheel constructed in accordance with my invention.

I employ the common metal hub, of any desirable shape, and also the common rod-iron for spokes. The tire, which is of wrought-iron, is composed of ordinary bar-iron, either half-oval, half-round, or flat.

In the hub A, I drill the two series of holes $d\ d$, all of an equal depth and partially through the same. I also drill in the tire a series of holes, $e$, of equal depth and corresponding in number to the number of holes in the hub, these said holes being drilled only partially through the tire, substantially as shown. I then calculate the expansion and contraction of the metal contained in the tire, by which I am enabled to cut the spokes of a proper length.

After drilling the holes in the hub and tire, as above described, I place the hub on its end and fit the spokes in its upper series of holes. I then heat the tire and drop it over the ends of the spokes upon a platform or rest adapted to raise it even with the middle of the hub, the spokes entering the holes in the tire. I then apply pressure in any suitable way, so as to force the hub downward, which consequently forces the upper tier of spokes into the tire while it is still expanded, the center of the hub during this operation passing the center of the tire. I then place the lower tier of spokes in the hub and enter their ends in the holes of the tire, after which, by releasing the pressure from the hub, it will recede or return to the center of the wheel as the tire contracts by cooling and the spokes take their solid bearings in the hub.

By such operation I am enabled to fit the spokes deeper in the tire by pressing the hub down past the center of the tire, and I also gain space to enable me to easily enter the lower tier of spokes.

I obtain a much lighter wheel by the above mode of construction than can be made by the usual way of employing cast-iron rims, and also obtain a strong and durable wheel by an exceedingly simple process.

Having thus described my invention, what I claim, and desire to secure by Letters Patent, is—

The herein-described mode of making wheels, the same consisting in securing the spokes in the upper series of holes in the hub, then dropping the heated and expanded tire around the spokes and in line with the center of the hub, next subjecting the hub to pressure, so as to cause it to pass the center of the tire, and finally fitting a second series of spokes in the hub and the expanded tire and removing pressure from the hub, substantially as described.

In testimony that I claim the above I have hereunto subscribed my name in the presence of two witnesses.

WILLIAM NEWLIN.

Witnesses:
   C. F. ROBINSON,
   A. B. ROBINSON.